United States Patent
Feng et al.

(10) Patent No.: US 9,521,165 B2
(45) Date of Patent: *Dec. 13, 2016

(54) METHOD OF DETECTING POTENTIAL PHISHING BY ANALYZING UNIVERSAL RESOURCE LOCATORS

(71) Applicant: AT&T Intellectual Property I, L.P., Atlanta, GA (US)

(72) Inventors: Junlan Feng, Beijing (CN); Valerie Torres, Summit, NJ (US); Daniel G. Sheleheda, Florham Park, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,286

(22) Filed: Jun. 2, 2015

(65) Prior Publication Data

US 2015/0264086 A1    Sep. 17, 2015

Related U.S. Application Data

(63) Continuation of application No. 13/889,059, filed on May 7, 2013, now Pat. No. 9,058,487, which is a continuation of application No. 12/479,162, filed on Jun. 5, 2009, now Pat. No. 8,438,642.

(51) Int. Cl.
| | |
|---|---|
| *G06F 11/00* | (2006.01) |
| *H04L 29/06* | (2006.01) |
| *G06F 21/56* | (2013.01) |
| *G06F 21/57* | (2013.01) |
| *G06F 21/55* | (2013.01) |
| *G06F 17/30* | (2006.01) |
| *H04L 29/08* | (2006.01) |

(52) U.S. Cl.
CPC ..... *H04L 63/1483* (2013.01); *G06F 17/30887* (2013.01); *G06F 21/554* (2013.01); *G06F 21/566* (2013.01); *G06F 21/57* (2013.01); *H04L 63/0245* (2013.01); *H04L 67/02* (2013.01); *H04L 67/10* (2013.01); *G06F 2221/2101* (2013.01); *G06F 2221/2119* (2013.01); *H04L 63/1441* (2013.01)

(58) Field of Classification Search
CPC ...... H04L 63/1483; H04L 67/10; H04L 67/02; H04L 63/0245; H04L 63/1441; G06F 17/30887; G06F 21/554; G06F 21/566; G06F 21/57; G06F 2221/2119
USPC .......................................................... 726/23
See application file for complete search history.

(56) References Cited

U.S. PATENT DOCUMENTS

| | | |
|---|---|---|
| 6,321,267 B1 | 11/2001 | Donaldson |
| 7,624,277 B1 | 11/2009 | Simard et al. |
| 7,630,987 B1 | 12/2009 | Renfro et al. |

(Continued)

FOREIGN PATENT DOCUMENTS

GB    2462456    2/2010

*Primary Examiner* — Mohammad W Reza
(74) *Attorney, Agent, or Firm* — Akerman LLP; Michael K. Dixon; Mammen (Roy) P. Zachariah, Jr.

(57) ABSTRACT

A method for detecting potential phishing URLs includes extracting a URL from a document, analyzing the URL context, and comparing the URL to stored trusted URLs and stored known phishing URLs. The URL context includes anchor text and surrounding content associated with the URL. The method further includes generating a phishing alert based on the comparing and the analyzing.

20 Claims, 6 Drawing Sheets

(56) References Cited

U.S. PATENT DOCUMENTS

| | | |
|---|---|---|
| 7,706,613 B2 | 4/2010 | Smirnov |
| 7,751,620 B1 * | 7/2010 | Cosoi .................. G06K 9/4652 |
| | | 382/168 |
| 7,882,187 B2 | 2/2011 | Gammage et al. |
| 7,921,159 B1 | 4/2011 | Cooley |
| 7,958,555 B1 | 6/2011 | Chen et al. |
| 8,707,426 B1 | 4/2014 | Ramzan et al. |
| 2005/0015614 A1 * | 1/2005 | Gilfix ..................... G06F 21/31 |
| | | 726/7 |
| 2005/0193073 A1 * | 9/2005 | Mehr ..................... H04L 51/12 |
| | | 709/206 |
| 2006/0080735 A1 | 4/2006 | Brinson et al. |
| 2006/0123464 A1 | 6/2006 | Goodman et al. |
| 2006/0123478 A1 | 6/2006 | Rehfuss et al. |
| 2006/0200855 A1 | 9/2006 | Willis |
| 2007/0039038 A1 * | 2/2007 | Goodman ........... H04L 63/1408 |
| | | 726/2 |
| 2007/0074119 A1 | 3/2007 | Komine et al. |
| 2007/0118528 A1 | 5/2007 | Choi et al. |
| 2007/0131865 A1 | 6/2007 | Lawrence et al. |
| 2007/0192855 A1 | 8/2007 | Hulten et al. |
| 2007/0283000 A1 | 12/2007 | Proux et al. |
| 2008/0034428 A1 | 2/2008 | Bejar et al. |
| 2008/0091765 A1 | 4/2008 | Gammage et al. |
| 2008/0092242 A1 | 4/2008 | Rowley |

\* cited by examiner

METHOD OF DETECTING POTENTIAL PHISHING BY ANALYZING UNIVERSAL RESOURCE LOCATORS

CROSS-REFERENCE TO RELATED APPLICATION

The present application is a continuation of and claims priority to U.S. patent application Ser. No. 13/889,059, filed on May 7, 2013, which claims priority to U.S. patent application Ser. No. 12/479,162, filed on Jun. 5, 2009, now U.S. Pat. No. 8,438,642, both of which are hereby incorporated by reference in their entireties.

FIELD OF THE DISCLOSURE

The present disclosure generally relates to communications networks, and more particularly relates to a method of detecting potential phishing by analyzing Universal Resource Locators (URLs).

BACKGROUND

Phishing generally refers to the concept of tricking a computer user into submitting personal information to a bogus website. Phishing also refers to the techniques used to trick users. The personal information, such as generally private identifying information, login information for online banking, credit card numbers, and other valuable information, is often used to commit fraud, including identity theft.

One common phishing tactic is to send an email message to a large number of users. The identity of the message sender and the message content can be arranged to look like the source is a legitimate business. The message may indicate that the user needs to resubmit some personal data so that the business can continue to serve the user. The email message can contain a link to a bogus website that may look virtually identical to the pages offered by the legitimate site. Because links are difficult to read and can use foreign characters that look like normal characters to the user, users can be fooled into visiting the bogus website and providing valuable personal data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
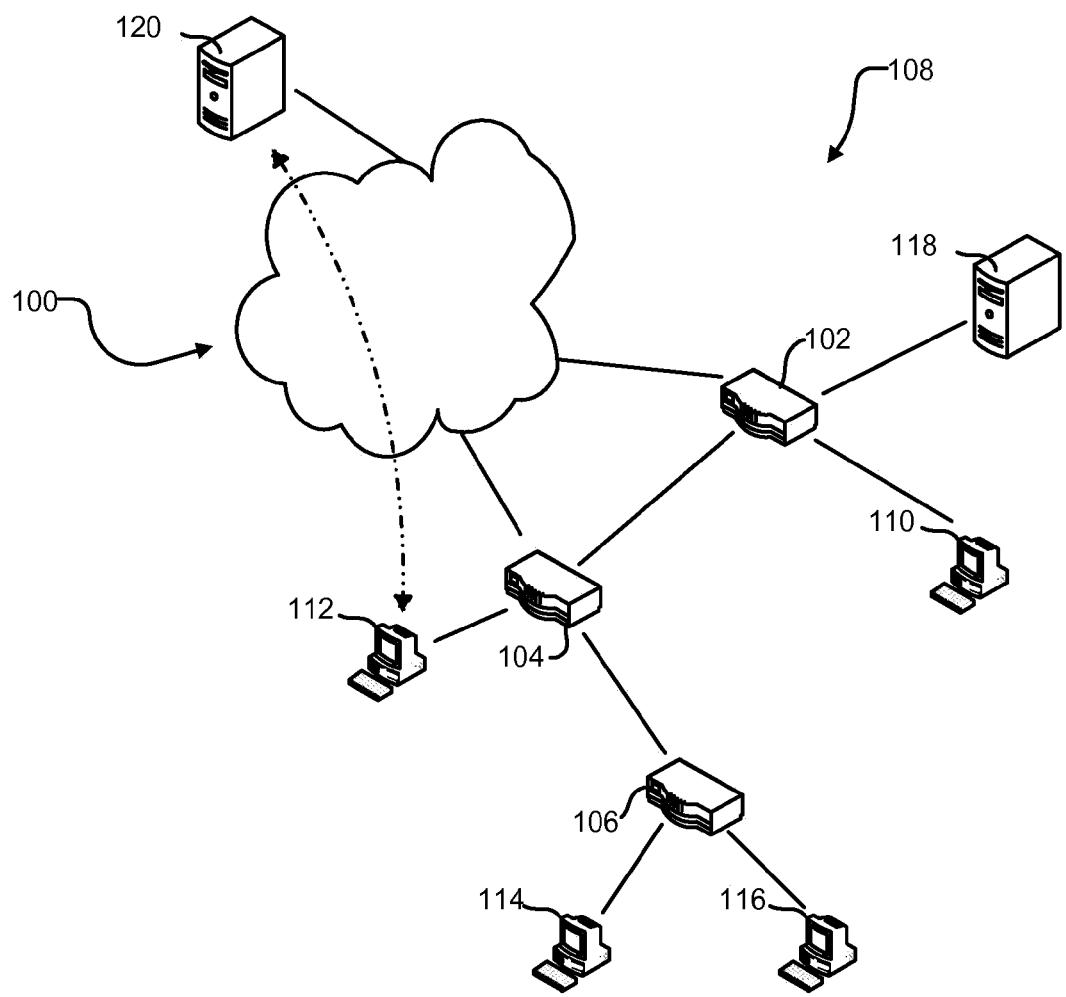
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Client systems 110 through 116 can access a website on server 120 using a Universal Resource Locators (URL) including a hostname for server 120. A user may type the URL or may click on a link embedded in a webpage or an email. Additionally, a user may receive a URL including a hostname that appears similar to the hostname for server 120, but can instead direct the user to a phishing server that mimics the webpages available from server 120 and attempts to obtain personal information. In an embodiment, client systems 110 through 116, routers 102 through 106, DNS server 118, or server 120 can attempt to inform the user of a potential phishing site by identifying URLs including suspicious hostnames. Suspicious hostnames can appear similar to legitimate hostnames by replacing characters with similar looking characters from a same or different alphabet and by deleting or rearranging characters within the hostname. As used herein, an alphabet refers to a set of characters used to represent writing in a language. Different languages, such as English, Greek, and Japanese, can use different alphabets.

Figure 2:
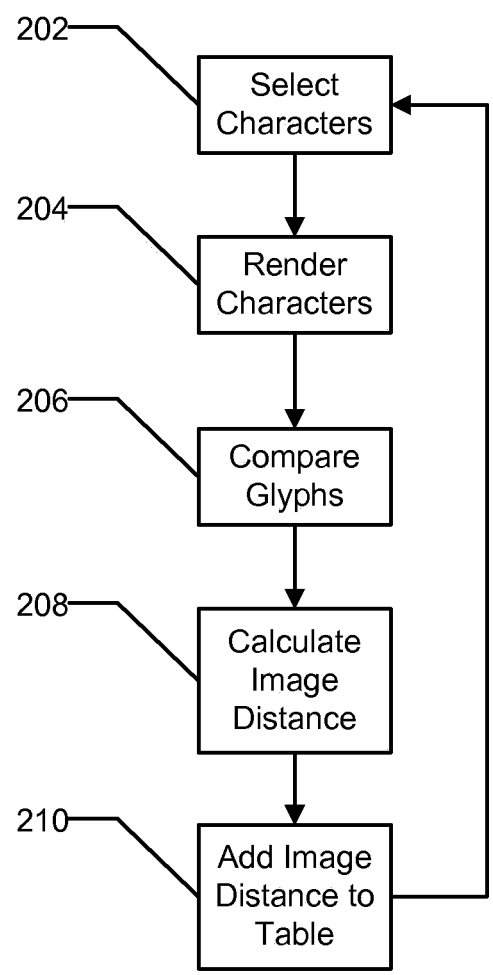
FIG. 2 is a flow diagram illustrating a method of identifying characters having similar images.

FIG. 2 illustrates an exemplary method of identifying characters having similar looking images. For example, the character "l" (a lower-case "L") can be similar to the character "1" (the Arabic numeral one). At 202, a pair of characters can be selected. At 204, the characters are rendered to form glyphs of the characters. As used herein, a glyph is a graphical representation of a character. The glyphs of the characters may depend on the font being used to render the characters. At 206, the glyphs of the characters can be compared using image analysis algorithms and an image distance between the glyphs can be determined, as illustrated at 208. For example, the image difference can include the number of pixels that are different between the two glyphs. In an embodiment, the image distance may be weighted based on which pixels are different. For example, pixels near the center of a glyph can be weighted differently than pixels near the edges of a glyph. Additionally, a number of changed pixels clustered in a portion of the glyph may be weighted differently than the same number of pixels scattered throughout the glyph. Preferably, the weighting of the image distance can represent the likelihood that a person would recognize the change. At 210, the image distance can be stored in a table for later use in comparing characters in a URL.

Figure 3:
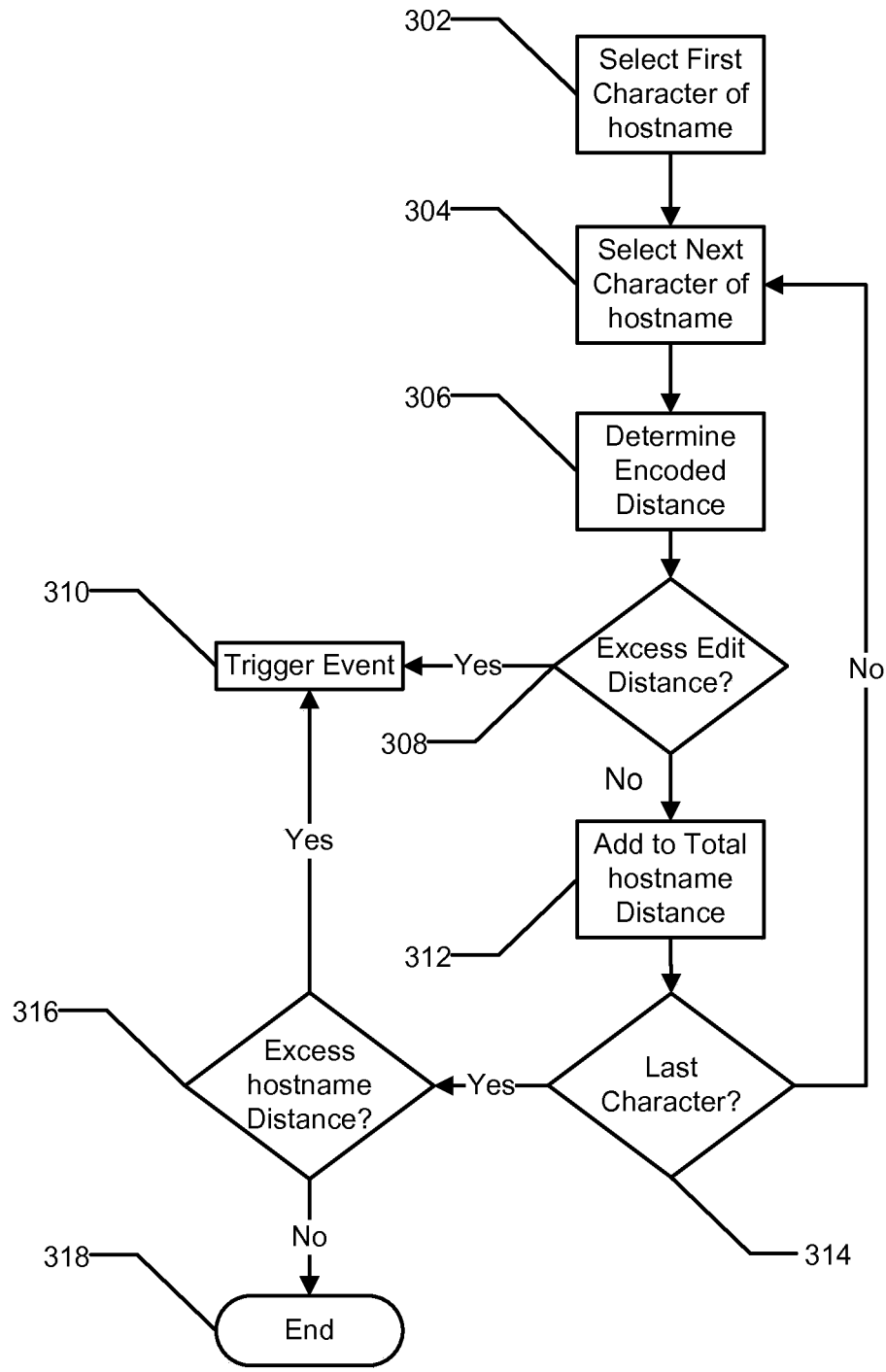
FIG. 3 is a flow diagram illustrating a method of identifying a possible phishing site.

FIG. 3 illustrates an exemplary method of identifying a possible phishing site. At 302, a system can select a first character of a hostname of a URL. The system can be a client system, a server, or a network device. As used herein, client systems, including desktops, laptops, smart phones and other handheld devices, are systems used to access and view web pages, media content, and the like, through the Internet and the World Wide Web. As used herein, network devices are systems, including routers, firewalls, proxy servers, DNS servers, security event information management systems, and intrusion detection systems, used to provide network access and network security to client systems. In an embodiment, the hostname may include multiple words separated by punctuation characters and the character can be a first character of a word within the URL. For example, the hostname www.cnn.com can have three words, "www," "cnn," and "com." At 304, the next character of the word or hostname can be selected. At 306, the encoded distance can be determined. As used herein, the encoded distance is the integral distance between two characters in a machine encoding. For example, in ASCII the character "A" is encoded as the decimal integer 65 and the character "a" is encoded as the decimal integer 97. The encoded distance between "A" and "a" in ASCII is 32. At 308, the encoded distance between two consecutive characters can be compared to a threshold. When the encoded distance between the two consecutive characters exceeds the threshold, an event can be triggered. For example, the triggered event can include notifying the user that the site may be a possible phishing site. Two characters having an excessive encoded difference may indicate that the hostname includes characters from different alphabets.

Alternatively, when the encoded difference between two consecutive characters is not greater than the threshold, the encoded difference may be added to a hostname distance. The hostname distance can be the sum of the encoded distances between consecutive pairs of characters. Alternatively, the hostname distance can be an average encoded distance. At 314, the system can check to see if the character is the last character of the hostname or the word. When the character is not the last character of the hostname or the word, the system can select another character at 304.

Alternatively, the system can determine if the hostname distance exceeds a hostname distance threshold, as illustrated at 316. When the hostname distance exceeds the hostname distance threshold, the system can trigger an event, as illustrated at 310 and previously discussed. Alternatively, when the hostname distance does not exceed the threshold, the method can end, as illustrated at 318, and the user may view the website normally.

Figure 4:
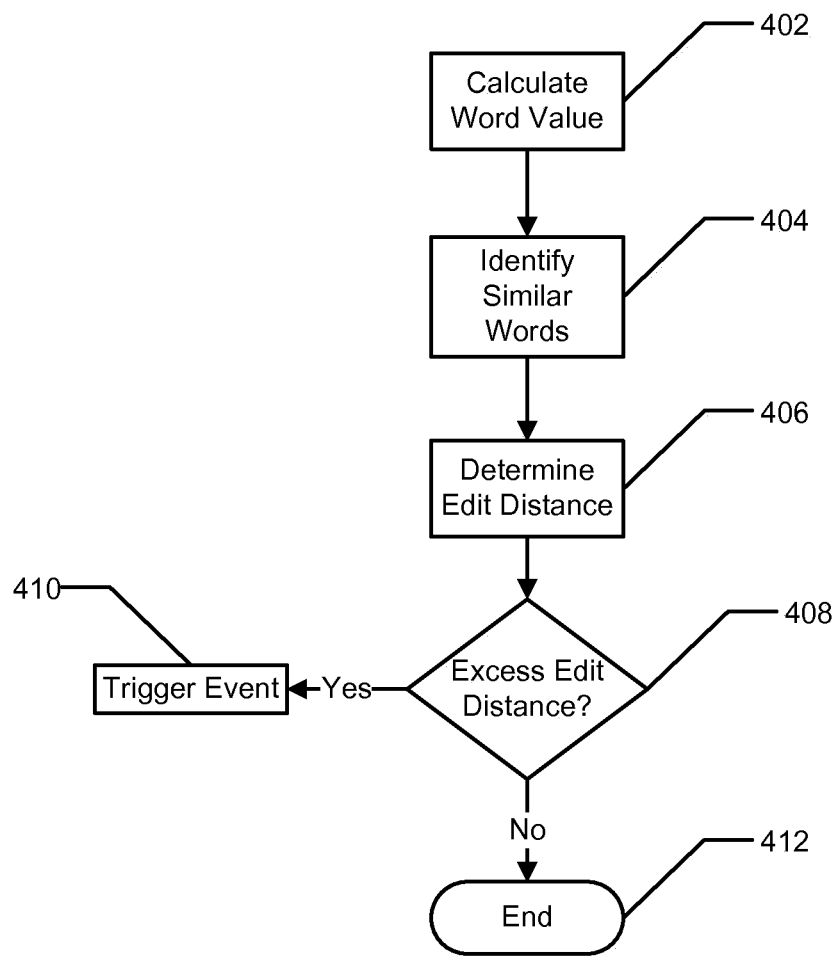
FIG. 4 is a flow diagram illustrating another method of identifying a possible phishing site.

FIG. 4 is a flow diagram illustrating another method of identifying a possible phishing site. At 402, the system can calculate a word value for a word or a hostname in a URL. The system can be a client system or a network device. The value can include a sum of the characters, a hash of the word, a hash of the glyphs in the word, or the like. At 404, the system can identify similar words from a domain name white list. The domain name white list can include a global white list, including verified hostnames and domain names, such as hostnames and domain names of well-known financial institutions. Additionally, the domain name white list can include a personal white list including hostnames and domain names of websites frequently visited by a user. At 406, the system can determine an edit distance between the word and similar words. In an embodiment, the edit distance does not need to be determined if the hostname is in the domain name white list.

As used herein, the edit distance is the number of changes required to change a first word into a second word. Changes can include adding or removing characters or substitution of one character for another. Additionally, the edit distance can be weighted based on the likelihood of a person recognizing the change. The weighting can include the location of the changes within the word, the image distance of the characters involved in a substitution, and the like. For example, generally people are less likely to recognize a deletion of the forth character of a word compared to the deletion of the first character of the word. Similarly, people are more likely to notice a substitution of substantially different characters that a substitution of characters that are substantially similar, such as characters that have a relatively small image distance.

At 408, the system can determine if the edit distance is below a threshold. When the edit distance is below the threshold, the similar words can have a high likelihood of being recognized as the same word by the user. When the edit distance is below the threshold, the system can trigger an event, as illustrated at 410. The event can include logging the website and the edit distance, displaying a warning to the user, and the like. Alternatively, when the edit distance is not below the threshold, the process can end, as illustrated at 412, and the user can be allowed to visit the website normally.

Figure 5:
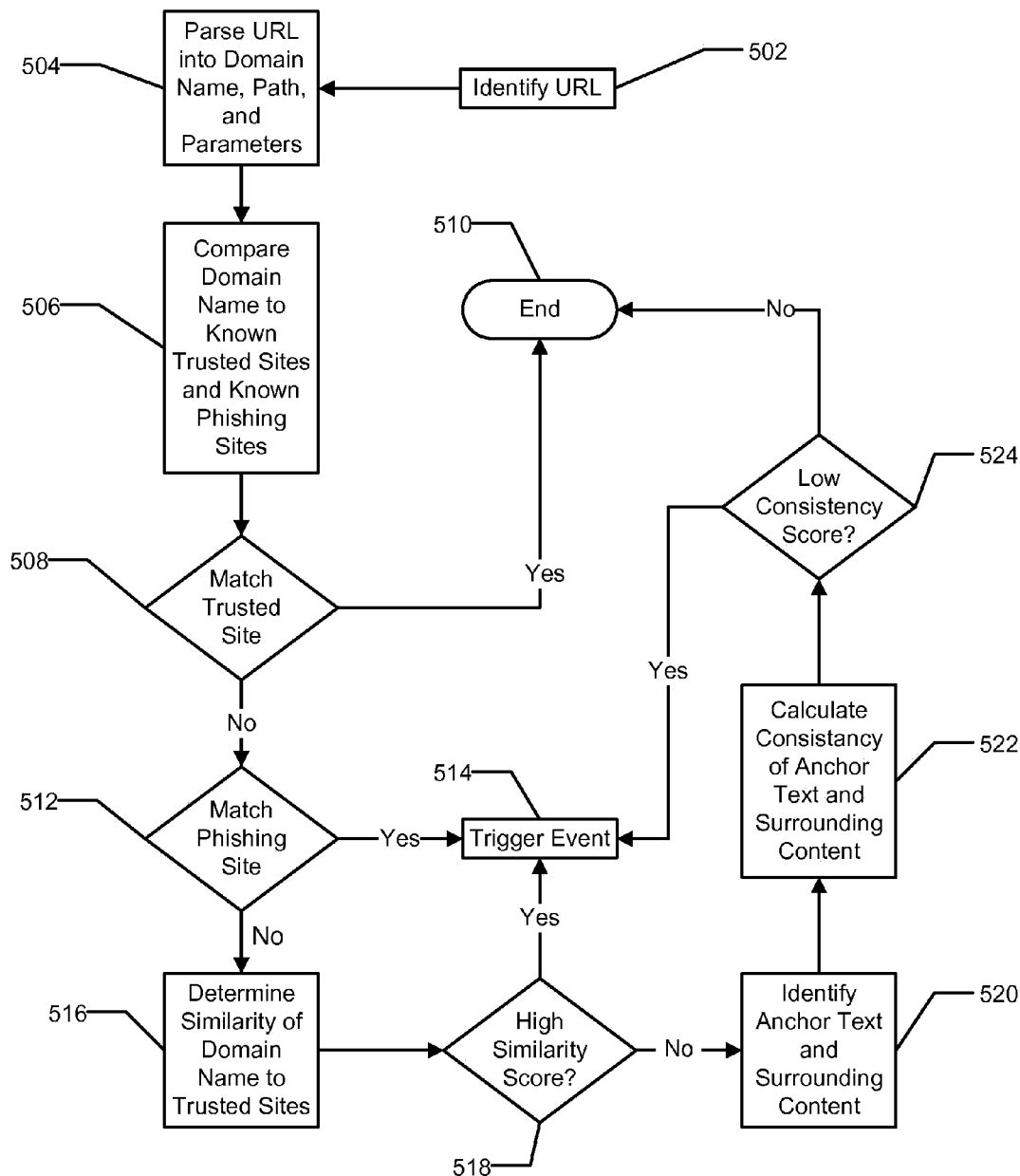
FIG. 5 is a flow diagram illustrating yet another method of identifying a possible phishing site.

FIG. 5 is a flow diagram illustrating yet another method of identifying a possible phishing site. At 502, the system can identify a URL within a document. The document can be part of a stored file or a message transferred between devices. For example, the document can include a web page, an email message, a twitter text, a mobile text message, a chat message, an instant message, or any combination thereof. The mobile text message can be a short message service (SMS) message or a multimedia messaging service (MMS) message.

At 504, the system can parse the URL into a domain name, a path and, optionally, a set of parameters. At 506, the system can compare the domain name of the URL to a set of trusted domain names and to a set of known phishing sites. The set of trusted domain names and the set of known phishing sites can be identified manually, automatically, or any combination thereof. For example, an algorithm can identify domain names that are linked widely by other trusted web sites as trusted domain names. Additionally, the set of trusted domain names can be manually verified to assure accuracy.

At 508, the system can determine if the domain name matches a trusted domain name. When the domain name matches a trusted domain name, the method can end, as illustrated at 510. Alternatively, when the domain name does not match any of the trusted domain names, as illustrated at 512, the system can determine if the domain name matches a known phishing site. When the domain name matches a known phishing site, an event can be triggered, as illustrated at 514. For example, a user may be provided with an alert that they are about to visit a potential phishing site.

Alternatively when the domain name does not match any of the known phishing sites, the system can determine a similarity between the domain name and each of the trusted domain names, as illustrated at 516. In an embodiment, the system can determine an image distance between the domain name and each of the trusted domain names. In another embodiment, the system can determine an edit distance between the domain name and each of the trusted domain names. In yet another embodiment, the system can use a model to determine the similarity. The model can be developed through machine learning techniques, through analysis of previously identified phishing domain names, through mining the web, and through analysis of web logs. For example, a machine learning technique may identify text patterns within known phishing domain names or typical substitutions used by phishing sites to create domain names that are successful at deceiving users.

At 518, the system can determine if the domain name has a high similarity score to a trusted domain name. For example, the edit distance and/or the image distance can be below a threshold or the domain name can have a strong match to the model. When the domain name has a high similarity score, an event can be triggered, as illustrated at 514.

Alternatively, when the domain name does not have a high similarity score, at 520, the system can identify the anchor text and the content surrounding the URL. The anchor text can be the text displayed as the hypertext link. At 522, the system can calculate a consistency between the anchor text and the surrounding content with the URL. In an embodiment, the system can compare the anchor text and surrounding text to the domain name, the parameters, the path, or any combination thereof. At 524, the system can determine if the URL has a low consistency score. When the URL has a low consistency score, an event can be triggered, as illustrated at 514. For example, the URL may have a low consistency score if the anchor text matches a portion of the URL parameters or if the URL includes characters of a character set not matching the character set used in the anchor text and the surrounding content.

Alternatively, when the URL does not have a low consistency score, the method can end, as illustrated at 510. For example, the URL may have a high consistency score when the anchor text matches the domain name.

Figure 6:
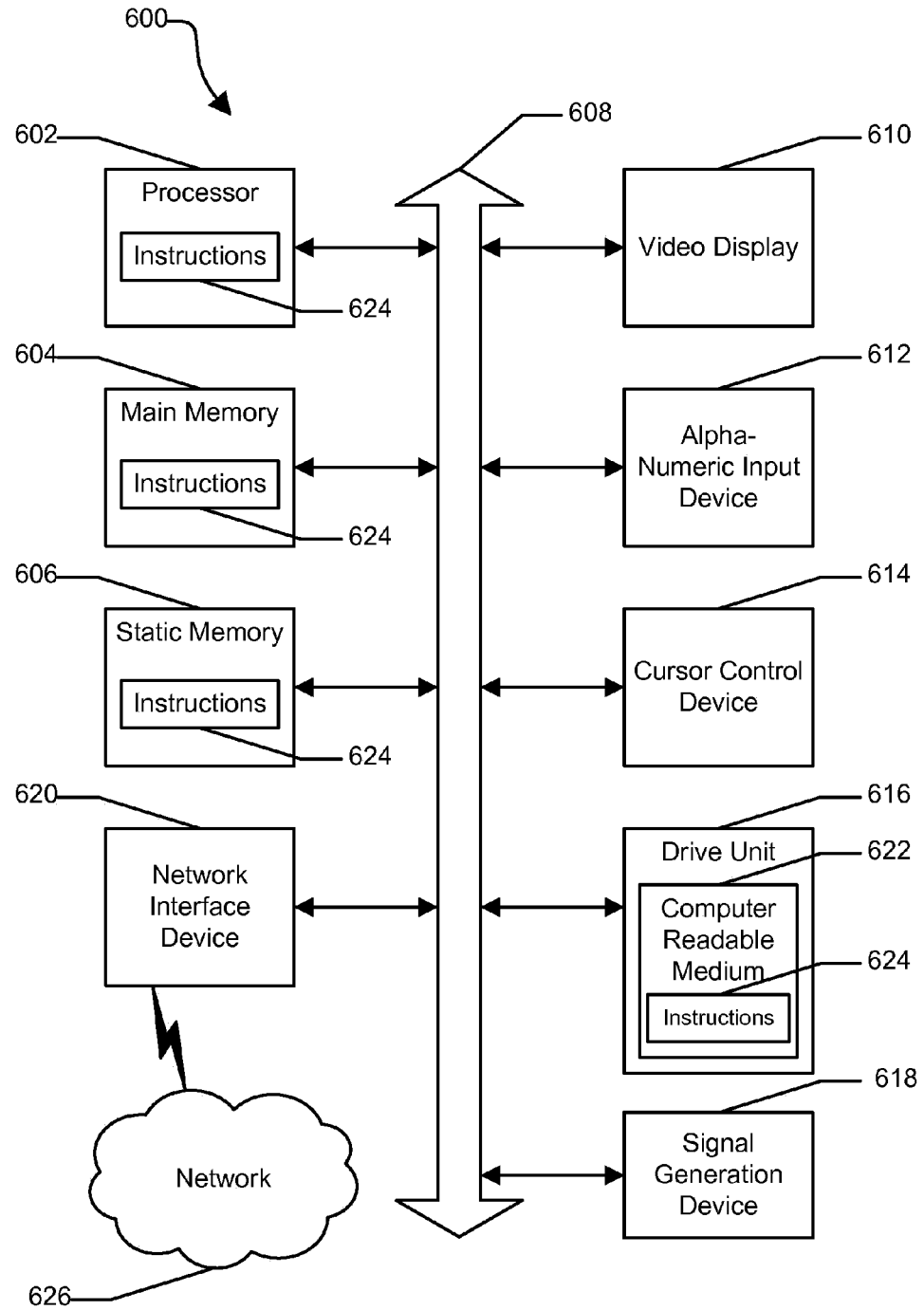
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
   a memory that stores instructions;
   a processor that executes the instructions to perform operations, the operations comprising:
   determining an encoded distance between a first character of a hostname of a universal resource locator and a next character of the hostname of the universal resource locator, wherein the encoded distance is an integral distance between the first character and the next character in a machine encoding;
   determining if the encoded distance exceeds a first threshold value;
   adding the encoded distance to a hostname distance if the encoded distance is determined to not exceed the first threshold value, wherein the hostname distance is a sum of encoded distances between consecutive pairs of characters of the hostname; and
   transmitting a first notification that indicates that the universal resource locator is associated with phishing if the hostname distance is determined to exceed a threshold hostname distance value.

2. The system of claim 1, wherein the operations further comprise transmitting a second notification that indicates that the universal resource locator is associated with phishing if the encoded distance is determined to exceed the first threshold value.

3. The system of claim 1, wherein the operations further comprise determining if the hostname distance exceeds the threshold hostname distance value.

4. The system of claim 1, wherein the operations further comprise enabling access to the universal resource locator if the hostname distance is determined to not exceed the threshold hostname distance value.

5. The system of claim 1, wherein the operations further comprise calculating a word value for a first word in the universal resource locator.

6. The system of claim 5, wherein the operations further comprise identifying a second word from a white list that is similar to the first word in the universal resource locator.

7. The system of claim 6, wherein the operations further comprise determining an edit distance between the first word and the second word.

8. The system of claim 7, wherein the operations further comprise determining the edit distance by determining a number of changes required to change the first word into the second word.

9. The system of claim 6, wherein the operations further comprise determining if the edit distance is below a second threshold value.

10. The system of claim 9, wherein the operations further comprise transmitting an alert if the edit distance is below the second threshold value.

11. A method comprising:
    calculating an encoded distance between a first character of a hostname of a universal resource locator and a next character of the hostname of the universal resource locator, wherein the encoded distance is an integral distance between the first character and the next character in a machine encoding;
    determining, by utilizing instructions from memory that are executed by a processor, if the encoded distance exceeds a first threshold value;
    adding the encoded distance to a hostname distance if the encoded distance is determined to not exceed the first threshold value, wherein the hostname distance is a sum of encoded distances between consecutive pairs of characters of the hostname; and
    generating a first notification that indicates that the universal resource locator is associated with phishing if the hostname distance is determined to exceed a threshold hostname distance value.

12. The method of claim 11, further comprising transmitting a second notification that indicates that the universal resource locator is associated with phishing if the encoded distance is determined to exceed the first threshold value.

13. The method of claim 11, further comprising enabling access to the universal resource locator if the hostname distance is determined to not exceed the threshold hostname distance value.

14. The method of claim 11, further comprising calculating a word value for a first word in the universal resource locator.

15. The method of claim 14, further comprising determining an edit distance between the first word and a second word that is identified from a list as being similar to the first word.

16. The method of claim 15, further comprising determining if the edit distance is below a second threshold value.

17. The method of claim 16, further comprising triggering an event if the edit distance is below the second threshold value.

18. A computer-readable device comprising instructions, which, when loaded and executed by a processor, cause the processor to perform operations, the operations comprising:
    calculating an encoded distance between a first character of a hostname of a universal resource locator and a next character of the hostname of the universal resource locator, wherein the encoded distance is an integral distance between the first character and the next character in a machine encoding;
    determining if the encoded distance exceeds a first threshold value;

adding the encoded distance to a hostname distance if the encoded distance is determined to not exceed the first threshold value, wherein the hostname distance is a sum of encoded distances between consecutive pairs of characters of the hostname; and providing a first notification that indicates that the universal resource locator is associated with phishing if the hostname distance is determined to exceed a threshold hostname distance value.

19. The computer-readable device of claim 18, wherein the operations further comprise triggering an event if the encoded distance is determined to exceed the first threshold value.

20. The computer-readable device of claim 18, wherein the operations further comprise enabling access to the universal resource locator if the hostname distance is determined to not exceed the threshold hostname distance value.

\* \* \* \* \*